(12) United States Patent
Myers et al.

(10) Patent No.: US 9,109,499 B2
(45) Date of Patent: Aug. 18, 2015

(54) ENGINE WITH FLUID PASSAGE SEAL ASSEMBLY

(75) Inventors: Benjamin Carl Myers, Alpharetta, GA (US); Andrew Guy Kitchen, Northamptonshire (GB); Michael T. Stanley, Columbus, IN (US); Peter E. Jackson, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 871 days.

(21) Appl. No.: 13/338,933

(22) Filed: Dec. 28, 2011

(65) Prior Publication Data

US 2012/0223487 A1    Sep. 6, 2012

Related U.S. Application Data

(60) Provisional application No. 61/427,618, filed on Dec. 28, 2010.

(51) Int. Cl.
| F01P 7/00 | (2006.01) |
| F02B 19/16 | (2006.01) |
| F02F 1/10 | (2006.01) |

(52) U.S. Cl.
CPC . *F02B 19/16* (2013.01); *F02F 1/10* (2013.01); *Y02T 10/125* (2013.01)

(58) Field of Classification Search
USPC ...... 123/41.58, 41.72, 41.82 R, 41.82 A, 1 R; 277/313, 591, FOR. 248
See application file for complete search history.

(56) References Cited

U.S. PATENT DOCUMENTS

| 2,423,771 | A | * | 7/1947 | Gould | 277/644 |
| 3,353,522 | A | | 11/1967 | Ley | |
| 3,363,608 | A | | 1/1968 | Scherenberg et al. | |
| 3,577,961 | A | | 5/1971 | Deutschmann et al. | |
| 3,653,369 | A | | 4/1972 | Fangman et al. | |
| 3,765,385 | A | | 10/1973 | Conrad | |
| 5,062,393 | A | | 11/1991 | Smith et al. | |
| 5,072,697 | A | | 12/1991 | Sputhe | |
| 5,303,943 | A | * | 4/1994 | Batty, Jr. | 277/313 |
| 5,343,837 | A | | 9/1994 | Ward et al. | |
| 5,603,515 | A | | 2/1997 | Bock | |

FOREIGN PATENT DOCUMENTS

DE        3838119 A1 *  5/1990  ........... F02F 11/00

OTHER PUBLICATIONS

The International Search Report and the Written Opinion of the International Searching Authority dated May 23, 2012; International Application No. PCT/US2011/067585.

* cited by examiner

*Primary Examiner* — Hung Q Nguyen
(74) *Attorney, Agent, or Firm* — Faegre Baker Daniels LLP

(57) ABSTRACT

An interface between an engine block and a cylinder head is provided. The interface includes a ferrule that accommodates relative movement between the cylinder head and the engine block while maintaining sealing of fluid passages that extend between the cylinder head and the engine block. The interface thus forms a fluid passage seal assembly.

13 Claims, 3 Drawing Sheets

ENGINE WITH FLUID PASSAGE SEAL ASSEMBLY

TECHNICAL FIELD

This disclosure relates to an internal combustion engine joint design. More specifically, this disclosure relates an engine with a seal assembly for sealing a joint between a cylinder head and an engine block or cylinder block that provides resistance to leakage into fluid passages while accommodating movement between the cylinder head and the engine block.

BACKGROUND

Sealing between the cylinder head and the engine block or cylinder block of an internal combustion engine presents challenges because of the forces pushing these two components apart and because that movement can cause high pressure air and combustion gases to flow into fluid passages that extend into the cylinder head and the engine block. The situation may be worse if a combustion seal or gasket fails, because there may be little to prevent high-pressure air or combustion gases flowing from a combustion chamber and along a head gasket into fluid connections between the cylinder head and the engine block.

Intake manifold overpressure (IMOP) events are events where pressures in an intake manifold exceed the pressure of normal operation. The cause of these events may be combustion of the air-fuel mixture, also known as a charge, in an intake system. It is possible for a combustion wave during an IMOP event to pass by a cylinder undergoing an intake cycle. The higher intake manifold pressure and temperature experienced during an IMOP event may push additional hot charge past an open intake valve, which may result in elevated cylinder pressures and early compression ignition of the charge. The additional charge coupled with early combustion could then result in an elevated peak cylinder pressure, which may result in charge leakage. This leakage may then travel between the cylinder head and the engine block, entering fluid connections between the cylinder head and engine block.

Consequently, preventing charge leakage that passes through a combustion seal from leaking into one or more fluid systems through a fluid system interface between the engine's cylinder block and cylinder head is a concern. The fluid systems in question may be coolant and lubricating oil. Supercharging of an engine cylinder by adding high pressure in an intake manifold may cause charge leakage past a combustion seal when an intake manifold overpressure event or IMOP, as described hereinabove, occurs. A configuration that would reduce or eliminate the negative effects that can occur when charge or combustion gases escape into an interface between an engine block and a cylinder head would provide improved reliability and performance for internal combustion engines.

SUMMARY

This disclosure provides an internal combustion engine. The internal combustion engine comprises an engine block, a cylinder head, and a head gasket. The engine block includes at least one block fluid passage. The cylinder head is attached to the engine block and includes at least one head fluid passage in fluid communication with said at least one block fluid passage. The head gasket is sealingly positioned at an interface between the engine block and the cylinder head. A first counter bore is formed adjacent to the interface in at least one of the cylinder in the at least one head fluid passage and the engine block in the at least one block fluid passage. The first counter bore includes an inside diameter and a transverse land. The engine also includes a ferrule assembly that includes a ferrule and a seal. The ferrule has an outside diameter. The ferrule is positioned in at least one of the at least one block fluid passage and the at least one head fluid passage and is positioned in the first counter bore. The first seal is located between the outside diameter of the ferrule and the inside diameter of the first counter bore. The outside diameter of the ferrule and the inside diameter of the first counter bore exert a compression force on the first seal. A gap exists between an end of the ferrule and the transverse land of the first counter bore.

This disclosure also provides an internal combustion engine, comprising an engine block, a cylinder head, a head gasket and a fluid passage coupling. The cylinder head is attached to the engine block. The head gasket is sealingly positioned between the engine block and the cylinder head. The fluid passage coupling extends from an interior of the engine block through the head gasket to an interior of the cylinder head. The fluid passage coupling is sealingly engaged to the engine block and sealingly engaged to the cylinder head. The fluid passage coupling slidingly engages at least one of the cylinder head and the engine block.

This disclosure also provides an internal combustion engine, comprising an engine block, a cylinder head, a ferrule, a seal, and a cylinder head gasket. The engine block has a first fluid passage. The cylinder head has a second fluid passage. The ferrule is positioned in the first fluid passage and in the second fluid passage. The seal is positioned on the outside diameter of the ferrule. The cylinder head gasket is positioned between and is sealingly engaged to the engine block and the cylinder head. Attachment of the cylinder head to the engine block sealingly captures the ferrule between the cylinder head and the engine block.

Advantages and features of the embodiments of this disclosure will become more apparent from the following detailed description of exemplary embodiments when viewed in conjunction with the accompanying drawings.

DETAILED DESCRIPTION

Figure 1A:
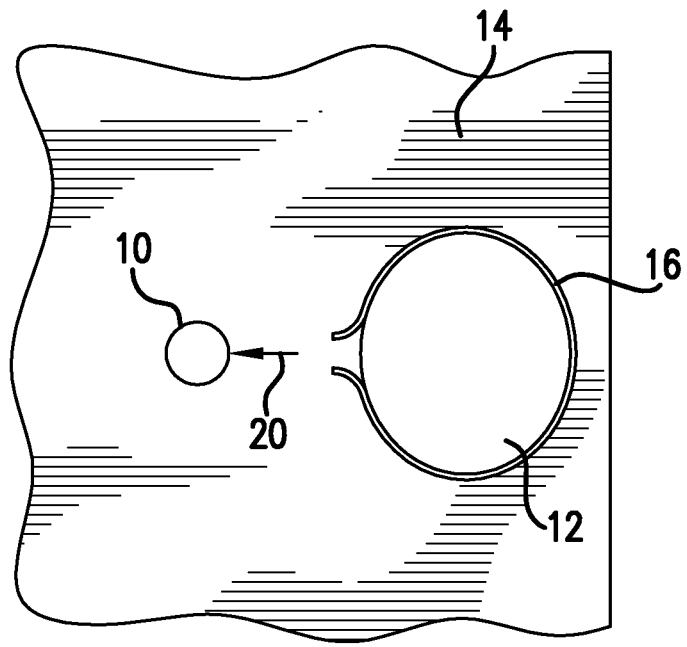
FIG. 1A is schematic plan view of a portion of a conventional internal combustion engine with a cylinder head removed to expose a cylinder head gasket, a fluid passage and an adjacent chamber.

There are an array of fluid passages between an engine block and a cylinder head. These fluid passages may be for coolant, lubrication, or other purposes. For example, shown in FIG. 1A is a fluid passage 10. Adjacent to fluid passage 10 is a combustion chamber 12. In the space between fluid passage 10 and combustion chamber 12 may be a gasket material 14, also called a head gasket 14. A combustion seal 16 may augment head gasket 14.

When the components of FIG. 1A operate properly, charge or combustion gases are contained within combustion chamber 12 by the action of combustion seal 16. However, fatigue or overpressure in combustion chamber 12 may cause a failure of combustion seal 16, creating a breach 18 in combustion seal 16. If combustion seal 16 fails, the pressure of charge or combustion gases 20 causes those gases to travel across head gasket 14, positioned at the joint between the cylinder head and engine block, to an adjacent fluid passage 10. If charge or combustion gases enter a fluid passage 10, the result could be detrimental to an engine and potentially catastrophic.

Generally the engine block and cylinder head will include six (6) fluid passages requiring ferrules or jumper tubes; however, any number of ferrules may be used depending on the number of passages provided.

To provide a requisite seal at the joint between the cylinder head and engine block, a seal assembly using ferrules or jumper tubes may form a fluid passage coupling between the cylinder head and engine block, as will be described in more detail hereinbelow. The ferrules or jumper tubes allow the cylinder head to lift during excessive cylinder pressure events while maintaining a seal with the fluid passage and preventing high-pressure gas that passes by or through a combustion seal from entering the fluid passage. The configuration of these seal assemblies allows retrofitting of the seal assemblies on existing engines and permits incorporation of these seals into new engine designs with minimal impact on the overall engine design. The configuration of these ferrules or jumper tubes also maintains clamp load on the head gasket since the ferrules or jumper tubes "float" with respect to the cylinder head, meaning there is a gap between either the ferrules or jumper tubes and the cylinder head or between the ferrules and the engine block.

Figure 1B:
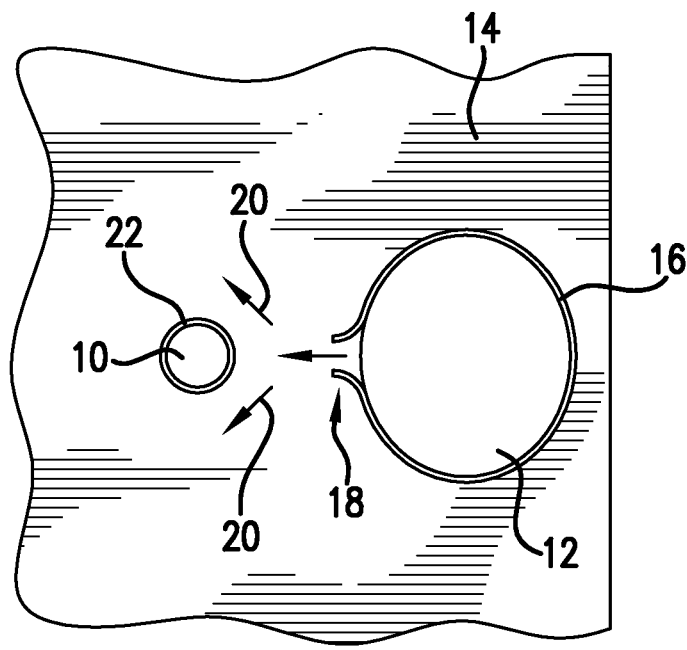
FIG. 1B is a schematic plan view of a portion of an internal combustion engine with a cylinder head removed to expose a cylinder head gasket, a fluid passage, a ferrule, and an adjacent combustion chamber in accordance with an exemplary embodiment of the present disclosure.

Referring now to FIG. 1B, there is a schematic view of an exemplary embodiment of the present disclosure. Fluid passage 10 is adjacent to combustion chamber 12, as in FIG. 1A. Head gasket 14 and combustion seal 16 reside in the space between fluid passage 10 and combustion chamber 12. Fluid passage 10 now has a ferrule or jumper tube 22. Throughout this description ferrule and jumper tube are consider equivalent terms. Ferrule 22 may consist of one or more configurations designed to prevent intrusion of charge or combustion gases 20 from entering fluid passage 10 while aiding to retain the integrity of fluid passage 10. Thus, charge and combustion gases 20 escaping through a breach 18 flow past fluid passage 10 rather than entering fluid passage 10. Hereinbelow are detailed descriptions of various exemplary embodiments of ferrule 22.

Figure 2:
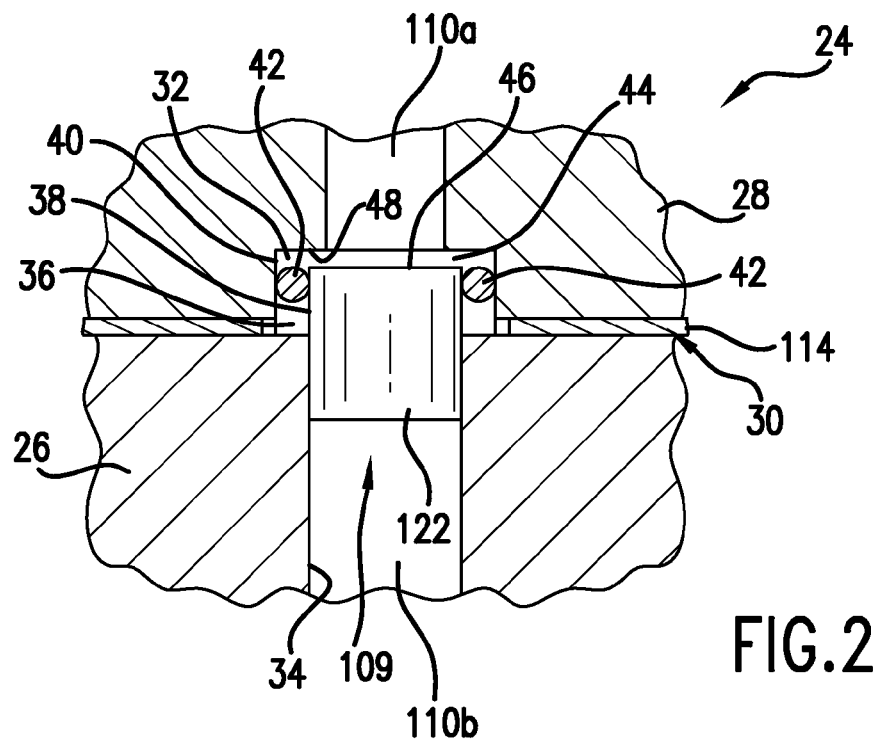
FIG. 2 is a view of a partial cross section of a portion of engine in accordance with a first exemplary embodiment of the present disclosure.

Referring now to FIG. 2, a portion of an internal combustion engine system 24 is shown. Engine system 24 may include an array of elements, such as pistons, shafts, filters, aftertreatment, and systems (not shown). Engine system 24 may also include an engine block 26 and an associated cylinder head 28. In a gap 30 between cylinder head 28 and engine block 26 is a head gasket 114. A fluid passage 110a is formed in cylinder head 28. A fluid passage 110b is formed in engine block 26 and aligned with, and fluidly connected to, fluid passage 110a to permit passage of fluid, such as coolant, lubrication fluid, or other fluid, between the block and head. A counter bore 32, which is adjacent to fluid passage 110a, is formed in cylinder head 28. A ferrule 122 is pressed into fluid passage 110b in contact with an inner diameter 34 of fluid passage 110b, which, as will be seen, forms a fluid passage coupling. The contact ferrule 122 makes with inner diameter 34 is also known as a press fit or interference fit. A space 36 exists between an outside diameter 38 of ferrule 122 and an inside diameter 40 of counter bore 32. Located within space 36 is an annular seal 42. Seal 42 may be a variety of configurations, for example, an o-ring, a square or rectangular gasket, a form-in-place material, or other shapes and configurations suitable to the purposes described in this disclosure. Seal 42 may be a separate component, it may be molded on or adhered to outside diameter 38 of ferrule 122, or it may be molded on or adhered to inside diameter 40 of counter bore 32. The seals described in subsequent embodiments may have a similar configuration; meaning that a seal serving the function of a depicted seal may be formed on or adhered to a ferrule in the general location a seal is shown.

The combination of seal 42 and ferrule 122 form a seal or ferrule assembly 109. The radial width of space 36 in combination with the diameter of seal 42 determines the amount of compression on seal 42 due to the compressive abutment between the seal and the surfaces forming the passage. The compression on seal 42 needs to be sufficient to prevent charge or combustion gases from escaping through an abutment interface between seal 42 and inside diameter 40 of counter bore 32 or an abutment interface between seal 42 and outside diameter 38 of ferrule 122. A longitudinal gap 44 exists between an end portion 46 of ferrule 122 and a transverse land 48 of counter bore 32. Gap 44 prevents the clamp force of cylinder head 28 from transmitting through ferrule 122. Longitudinal gap 44 should be sufficiently small to prevent seal 42 from extruding through longitudinal gap 44. The width of longitudinal gap 44 depends on the material of o-ring 42 and the expected pressure differential across seal 42.

As previously noted, one of the possible issues with a typical configuration is that a cylinder head may be moved away from an engine block due to the force of either charge or combustion gases in the engine cylinders. Because of this movement, the clamp load or compression on head gasket 114 may relax, permitting charge or combustion gases to travel between head gasket 114 and engine block 26 or between head gasket 114 and cylinder head 28. In the configuration of FIG. 2, charge or combustion gases will reach ferrule 122. Because ferrule 122 has a press fit with inner diameter 34 of fluid passage 110b to create an annular seal between the outer surface of ferrule 122 and inner diameter 34, charge or combustion gases are unable to pass between outside diameter 38 of ferrule 122 and inside diameter 34 of fluid passage 110b. Similarly, the amount of compression on seal 42 prevents charge or combustion gases from passing by seal 42. Either the compression load on seal 42 or the width of gap 44 prevents seal 42 from extruding through gap 44 by the force of charge or combustion gases. Thus, charge or combustion gases escaping from a combustion chamber flow around ferrule 122. The charge or combustion gases eventually escape from a periphery of head gasket 114. Because seal 42 is unconstrained in the longitudinal direction due to the depth of counter bore 32, seal 42 maintains an annular seal with outside diameter 38 of ferrule 122 and with inside diameter 40 of counter bore 32 during movement of cylinder head 28. Thus, the configuration of the present disclosure prevents charge and combustion gases that escape from a combustion chamber from traveling along head gasket 114 to enter either fluid passage 110a or 110b, and this ability is maintained in the presence of movement of cylinder head 28 with respect to engine block 26.

It is also anticipated that the above configuration could be reversed so that the press fit of ferrule 122 is in cylinder head 28 and a counter bore is formed in engine block 26. The above description would apply to this configuration, substituting "engine block" for "cylinder head" and substituting "cylinder head" for "engine block."

Figure 3:
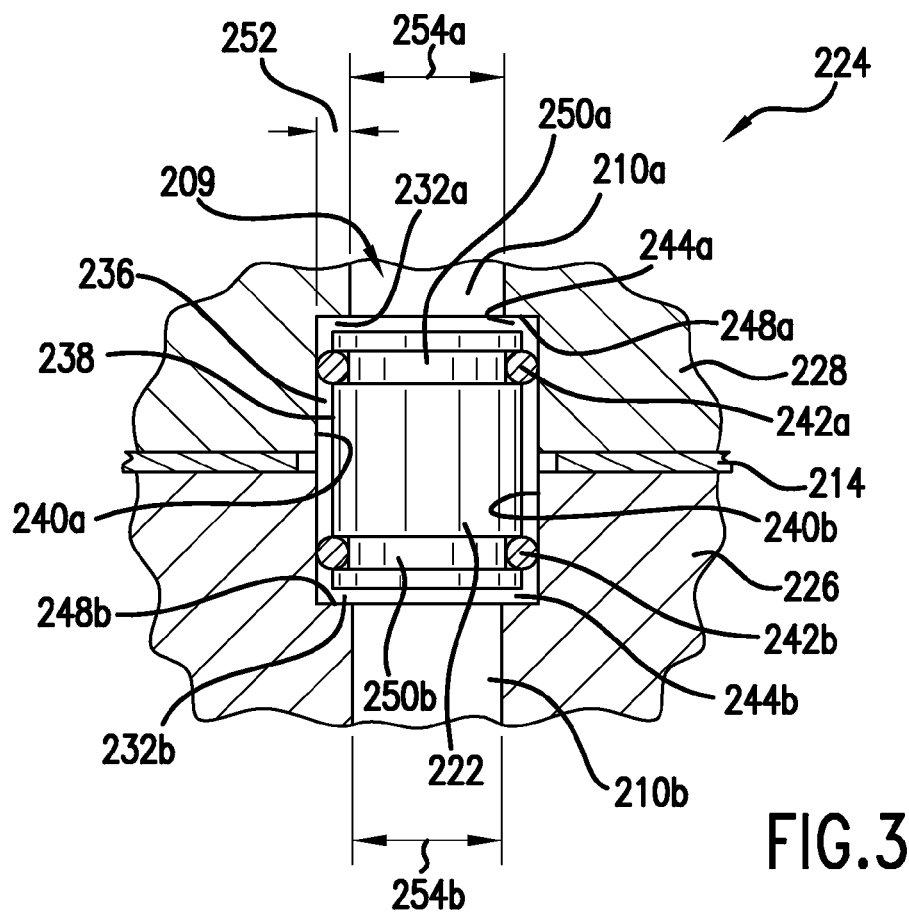
FIG. 3 is a view of a partial cross section of a portion of engine in accordance with a second exemplary embodiment of the present disclosure.

Shown in FIG. 3 is a second exemplary embodiment of the present disclosure. An internal combustion engine system 224 includes a cylinder head 228, an engine block 226 and a head gasket 214. Head gasket 214 provides a fluid seal between cylinder head 228 and engine block 226. Cylinder head 228 has a counter bore 232a formed therein. Engine block 226 has a counter bore 232b formed therein. Positioned or captured in counter bore 232a and in counter bore 232b is a ferrule 222. Ferrule 222 has a first annular seal 242a located in a first seal groove 250a and a second annular seal 242b located in a second seal groove 250b. Ferrule 222, seal 242a and seal 242b form a ferrule assembly 209. Seal 242a contacts an inside diameter 240a of counter bore 232a to form an abutment interface and seal 242b contacts an inside diameter 240b of counter bore 232b to form an abutment interface. A gap 236 exists between inside diameter 240a of cylinder head 228 and an outside diameter 238 of ferrule 222 and between inside diameter 240b of engine block 226 and outside diameter 238. As shown in FIG. 3, seal groove 250a has a diameter that is less than the outside diameter 238 of ferrule 222. Similarly, seal groove 250b has a diameter that is less than the outside diameter 238 of ferrule 222. The diameter of seal groove 250a may be the same as seal groove 250b or the diameters may be different. The difference between the diameter of seal groove 250a, and similarly seal groove 250b, and inside diameter 240a of cylinder head 228, and similarly inside diameter 240b of engine block 226, is the diametric clearance between seal groove 250a and inside diameter 240a, and similarly the diametric clearance between seal groove 250b and inside diameter 240b. Half the diametric clearance is a radial clearance 252. Radial clearance 252 determines the amount of compression on seal 242a. Similarly, the radial clearance between seal groove 250b and inside diameter 240b of engine block 226 determines the amount of compression on seal 242b. A fluid passage 210a formed in cylinder head 228 has a fluid passage inside diameter 254a. A fluid passage 210b formed in engine block 226 has a fluid passage inside diameter 254b. The outside diameter 238 of ferrule 222 is larger than fluid passage inside diameter 254a and fluid passage inside diameter 254b. The result is that when cylinder head 228 is attached to engine block 226, ferrule 222 is captured between cylinder head 228 and engine block 226. A longitudinal gap 244a may exist between an end portion 246a of ferrule 222 and a transverse land 248a of counter bore 232a or a longitudinal gap 244b may exist between an end portion 246b of ferrule 222 and a transverse land 248b of counter bore 232b, or both longitudinal gap 244a and longitudinal gap 244b may exist. The presence of either longitudinal gap 244a or longitudinal gap 244b prevents the clamp force from the attachment of cylinder head 228 to engine block 226 from transmitting through ferrule 222.

Ferrule assembly 209 operates similarly to ferrule assembly 109 in FIG. 2. The amount of compression on seal 242a, which depends on radial clearance 252 and the diameter of seal 242a, determines the ability of seal 242a to resist pressure from charge or combustion gases that might leak past head gasket 214. Seal 242a should also have sufficient compression to retain any fluids that might be in fluid passage 210a. Similarly, the radial clearance between seal groove 250b and inside diameter 240b of counter bore 232b determines the compression of seal 242b, which determines the ability of seal 242b to resist pressure from charge or combustion gases that might leak past head gasket 214. As with seal 242a, seal 242b should also have sufficient compression to retain any fluid that might be in fluid passage 210b.

Another function of ferrule assembly 209 is to permit relative movement between cylinder head 228 and engine block 226 while keeping any charge gas or combustion gases that might escape past head gasket 214 separate from any fluids in either fluid passage 210a or fluid passage 210b. In the event of relative movement between cylinder head 228 and engine block 226, seal 242a and seal 242b permit longitudinal movement of either cylinder head 228 or engine block 226 relative to ferrule assembly 209. This movement is possible since seal 242a will slide or move along inside diameter 240a of counter bore 232a and seal 242b will slide or move along inside diameter 240b of counter bore 232b. Because the compression of seal 242a and seal 242b remains the same throughout the movement of cylinder head 228 with respect to engine block 226, which is primarily longitudinal because of how cylinder head 228 attaches to engine block 226, ferrule assembly 209 retains its ability to prevent charge or combustion gases from entering either fluid passage 210a or fluid passage 210b, as well as retaining the fluid within fluid passages 210a and 210b, when cylinder head 228 moves with respect to engine block 226.

Figure 4:
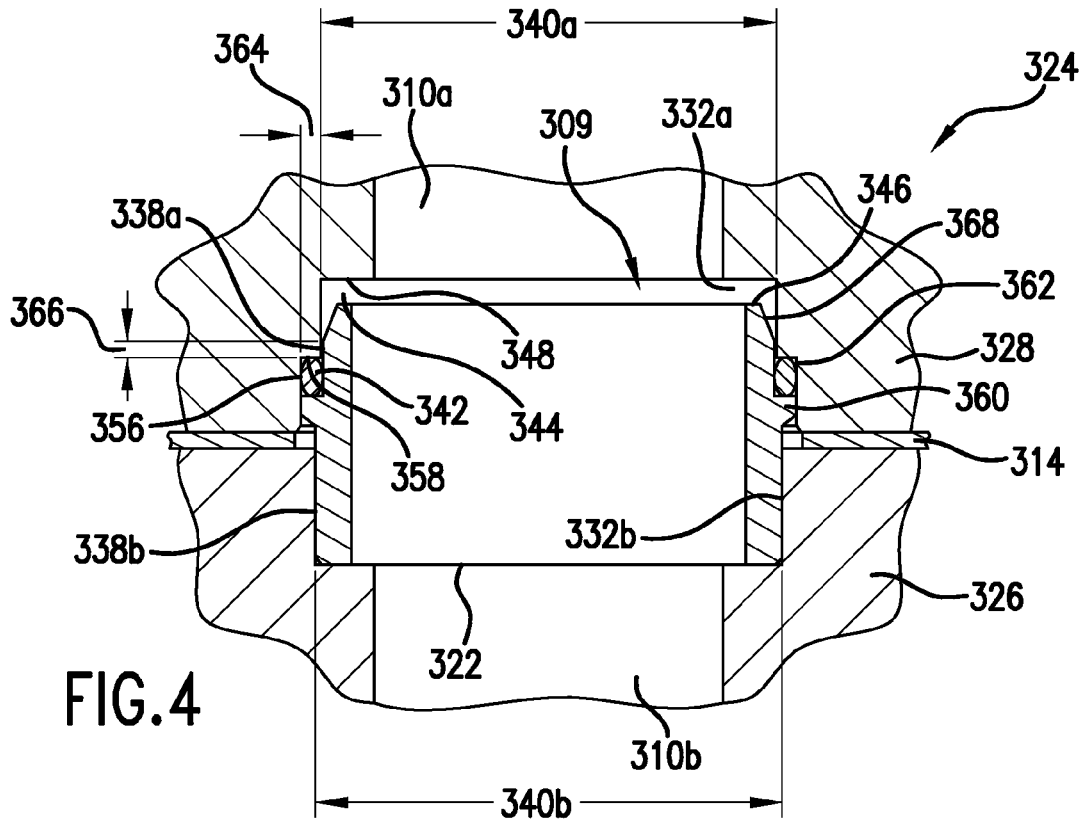
FIG. 4 is a view of a cross section of a portion of engine in accordance with a third exemplary embodiment of the present disclosure.

FIG. 4 shows a third exemplary embodiment of the present disclosure. An internal combustion engine system 324 includes a cylinder head 328, an engine block 326 and a head gasket 314. A ferrule assembly 309 includes a ferrule 322 and an annular seal 342. Ferrule assembly 309 is located in a counter bore 332a formed in cylinder head 328 and in a counter bore 332b formed in engine block 326. Head gasket 314 spaces cylinder head 328 from engine block 326, as well as providing a seal for combustion chambers formed in engine block 326 and fluid passages formed in both engine block 326 and cylinder head 328, such as a fluid passage 310a formed in cylinder head 328 and a fluid passage 310b formed in engine block 326.

An outside diameter 338b of ferrule 322 is larger than an inside diameter 340b of counter bore 332b. Thus, in order to install ferrule 322 into engine block 326, ferrule 322 must be a press or interference fit into counter bore 332b formed into engine block 326. This press fit provides a fluid seal between outside diameter 338b of ferrule 322 and engine block 326, more specifically, between outside diameter 338b and inside diameter of counter bore 332b.

A seal counter bore 356 is formed adjacent to counter bore 332a. Seal counter bore 356 has an inside diameter that is larger than the inside diameter of counter bore 332a. The result is a step or shelf 358 formed adjacent to counter bore 332a. A protrusion 360 is formed on a periphery of ferrule 322. Protrusion 360 has an outside diameter that is larger than the inside diameter of counter bore 332a, but smaller than the inside diameter of seal counter bore 356. An outside diameter 338a of ferrule 322 where it extends into counter bore 332a is slightly smaller than the inside diameter of counter bore 332a, resulting in a slip fit between ferrule 322 and cylinder head 328. Because of the various features just described, when ferrule 322 is installed within engine block 326 and cylinder head 328, a cavity 362 is formed by seal counter bore 356, ferrule 322 and protrusion 360. Seal 342 resides within cavity 362. The diameter of seal 342 is greater than a radial width 364 of cavity 362. Because seal 342 is larger than radial width 364, the outside diameter of ferrule 322 and the inside diameter of seal counter bore 356 compresses seal 342, forming an abutment interface. The compression of seal 342 provides an abutment interface fluid seal that assists in preventing charge and combustion gases that might escape from a combustion chamber from entering fluid passage 310a formed in cylinder head 328 and from entering fluid passage 310b formed in engine block 326. Ferrule 322 may have a chamfer or taper 368 formed thereon to aid in guiding ferrule 322 into counter bore 332a during assembly of cylinder head 328 onto engine block 326.

As with the previous embodiments, in the event of a charge or combustion gas overpressure event that might cause leakage of charge or combustion gases from a combustion chamber, cylinder head 328 may move a small amount away from engine block 326. As clamp force is reduced on head gasket 314, charge or combustion gases may travel along head gasket 314 either between head gasket 314 and cylinder head 328 or between head gasket 314 and engine block 326. Because outside diameter 338a of ferrule 322 is less than inside diameter 340a of counter bore 332a and because the diameter of protrusion 360 is less than the inner diameter of seal counter bore 356, cylinder head 328 is able to move relative to ferrule 322. Because outside diameter 338a of ferrule 322 extends a distance 366 into counter bore 332a past seal counter bore 356, and because the movement of cylinder head 328 is less than distance 366, seal 342 is unable to extrude past the small radial gap that exists between outside diameter 338a of ferrule 322 and inside diameter 340a of counter bore 332a. Thus, seal 342 is retained or captured in cavity 362 during movement of cylinder head 328 relative to engine block 326 in the event of charge gas or combustion gas escape from a combustion chamber. In addition, because the outside diameter 338a of ferrule 322 is larger than the inside diameter of fluid passage 310a, and because the outside diameter 338b of ferrule 322 is larger than the inside diameter of fluid passage 310b, ferrule 322 is captured between cylinder head 328 and engine block 326.

A gap 344 exists between an end portion 346 of ferrule 322 and a transverse land 348 of counter bore 332a. Gap 344 prevents clamp force from the attachment of cylinder head 328 to engine block 326 from transmitting through ferrule 322.

It should be apparent that the description of the embodiment shown in FIG. 4 may be reversed and achieve the benefits of the configuration shown in FIG. 4. Thus, in the foregoing discussion regarding FIG. 4, the features described as being in engine block 326 would work similarly when located in cylinder head 328 and the features described as being in cylinder head 328 would work similarly when located in engine block 326.

Figure 5:
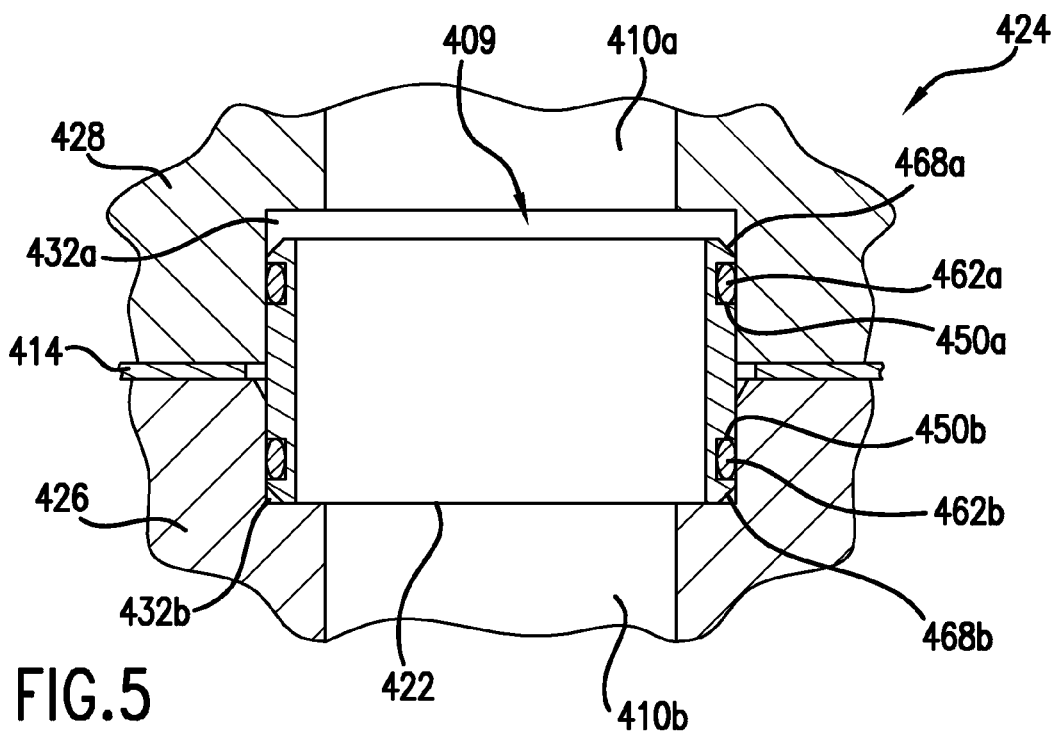
FIG. 5 is a schematic view of a cross section of a portion of engine in accordance with a fourth exemplary embodiment of the present disclosure.

FIG. 5 depicts a fourth exemplary embodiment of the present disclosure. An internal combustion engine system 424 includes a cylinder head 428, an engine block 426, and a head gasket 414. A ferrule assembly 409 includes ferrule 422, an annular seal 462a and an annular seal 462b. Ferrule assembly 409 is positioned in a counter bore 432a formed in cylinder head 428 and in a counter bore 432b formed in engine block 326. Because the outside diameter of ferrule 422 is larger than the inside diameter of fluid passage 410a, and because the outside diameter of ferrule 422 is larger than the inside diameter of fluid passage 410b, ferrule 422 is captured between cylinder head 428 and engine block 426. Head gasket 414 spaces cylinder head 428 from engine block 426, as well as providing a seal for combustion chambers formed in engine block 426 and fluid passages formed in both engine block 426 and cylinder head 428, such as a fluid passage 410a formed in cylinder head 428 and a fluid passage 410b formed in engine block 426.

Seal 462a resides in a seal groove 450a formed in ferrule 422. Seal 462b resides in a seal groove 450b formed in ferrule 422. The depth of seal groove 450a and the depth of seal groove 450b in combination with the inside diameter of counter bore 432a and counter bore 432b determine the amount of compression on seal 462a and seal 462b. As with the previous embodiments, the amount of compression on seal 462a and seal 462b determines the ability of ferrule assembly 409 to keep charge or combustion gases out of fluid passage 410a and fluid passage 410b.

As with the previous embodiment, ferrule 422 may have one or more chamfers or tapers 468a and 468b formed on either end of ferrule 422 at a periphery thereof. These chamfers or tapers 468a and 468b make installation of ferrule 422 into counter bore 432a and 432b easier.

In this configuration, extrusion of either seal 462a or seal 462b is prevented by formation of seal groove 450a and seal groove 450b in ferrule 422. Since the outside diameter of ferrule 422 is quite close to the inside diameter of counter bore 432a and counter bore 432b, which may be thousandths of an inch in difference, extrusion under anticipated pressures is extremely unlikely. Note that because there is a gap between the outside diameter of ferrule 422 and the inside diameter of counter bore 432a and the inside diameter of counter bore 432b, cylinder head 428 will be able to move relative to both engine block 426 and to ferrule 422. Since seal 462a and seal 462b are able to slide against the inside diameter of counter bore 432a and counter bore 432b, sealing of fluid passage 410a and fluid passage 410b is maintained in the presence of separating forces exerted on cylinder head 428. These separating forces may be from charge or combustion gases that might escape a combustion chamber and flow along head gasket 414.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. An internal combustion engine, comprising:
    an engine block including at least one block fluid passage;
    a cylinder head attached to the engine block and including at least one head fluid passage in fluid communication with said at least one block fluid passage;
    a head gasket sealingly positioned at an interface between the engine block and the cylinder head;
    a first counter bore formed adjacent the interface in at least one of the cylinder head in the at least one head fluid passage and the engine block in the at least one block fluid passage, the first counter bore including an inside diameter and a transverse land; and
    a ferrule assembly including a ferrule and a first seal, the ferrule having an outer surface, the ferrule being positioned in at least one of the at least one block fluid passage and the at least one head fluid passage, and positioned in the first counter bore;
    wherein the first seal is located between the outer surface of the ferrule and the inside diameter of the first counter bore, and the outer surface of the ferrule and the inside diameter of the first counter bore exert a compression force on the first seal;
    wherein a gap exists between an end of the ferrule and the transverse land of the first counter bore; and wherein the ferrule further includes a protrusion and the first seal is located between the protrusion and the transverse land of the first counter bore formed in the cylinder head.

2. The internal combustion engine of claim 1, wherein the ferrule is press fit into the engine block.

3. An internal combustion engine, comprising:
an engine block;
a cylinder head attached to the engine block;
a head gasket sealingly positioned between the engine block and the cylinder head; and
a fluid passage coupling extending from an interior of the engine block through the head gasket to an interior of the cylinder head;
wherein the fluid passage coupling is sealingly engaged to the engine block and sealingly engaged to the cylinder head;
wherein the fluid passage coupling sealingly engages at least one of the cylinder head and the engine block; and
wherein the fluid passage coupling includes a protrusion and the cylinder head includes a counter bore transverse land, and the seal is captured between the protrusion and the counter bore transverse land.

4. The internal combustion engine of claim 3, wherein the fluid passage coupling is press fit into the engine block.

5. The internal combustion engine of claim 3, wherein the fluid passage coupling is a ferrule.

6. The internal combustion engine of claim 3, further including a first seal positioned between the fluid passage coupling and the cylinder head.

7. The internal combustion engine of claim 6, wherein the fluid passage coupling and the cylinder head are configured to capture the first seal.

8. The internal combustion engine of claim 6, wherein the first seal is attached to the fluid passage coupling.

9. An internal combustion engine, comprising:
an engine block having a first fluid passage;
a cylinder head having a second fluid passage;
a ferrule positioned in the first fluid passage and in the second fluid passage a seal positioned on the outside diameter of the ferrule; and
a cylinder head gasket positioned between and sealingly engaged to the engine block and the cylinder head;
wherein attachment of the cylinder head to the engine block sealingly captures the ferrule between the cylinder head and the engine block; and
wherein the ferrule includes a protrusion, wherein a counter bore is formed in at least one of the engine block and the cylinder head, and wherein the counter bore has a transverse land, and the seal is positioned between the protrusion and the transverse land of the counter bore.

10. The internal combustion engine of claim 9, wherein the ferrule is sealingly engaged to the engine block.

11. The internal combustion engine of claim 9, wherein the ferrule is sealingly engaged to the cylinder head.

12. The internal combustion engine of claim 9, wherein the ferrule has an interference fit with the engine block.

13. The internal combustion engine of claim 9, wherein the seal is attached to the ferrule.

\* \* \* \* \*